United States Patent [19]

Tedeschi et al.

[11] Patent Number: 4,575,673
[45] Date of Patent: Mar. 11, 1986

[54] SOLID STATE ELECTRONIC SWITCH FOR MOTOR VEHICLES

[75] Inventors: Rinaldo R. Tedeschi, Newington; Arthur R. Emery, Windsor Locks, both of Conn.; Robert A. Edwards, Woodstock, England

[73] Assignee: United Technologies Corporation, Hartford, Conn.

[21] Appl. No.: 667,050

[22] Filed: Nov. 1, 1984

[51] Int. Cl.⁴ ............................................... H02J 1/00
[52] U.S. Cl. .................................... 323/351; 323/284; 323/285; 361/18; 361/88; 307/10 R
[58] Field of Search ..................... 323/284, 285, 351; 361/18, 21, 88, 92; 307/9, 10 R

[56] References Cited

U.S. PATENT DOCUMENTS 4,428,015 1/1984 Nesler ................................. 323/284

Primary Examiner—William H. Beha, Jr.
Assistant Examiner—Anita M. Ault
Attorney, Agent, or Firm—Dominic J. Chiantera

[57] ABSTRACT

A solid state power switch includes a gated switch for connecting electrical power to a load whenever the actual load current is less than selected current reference values.

10 Claims, 4 Drawing Figures

SOLID STATE ELECTRONIC SWITCH FOR MOTOR VEHICLES

DESCRIPTION

1. Technical Field

This invention relates to solid state switching devices, and more particularly to solid state electrical switches for controlling actuation of motor vehicle accessories.

2. Background Art

The automotive industry is rapidly expanding into the use of electronics for onboard vehicle operating systems. Most notable is the use of electronic engine control equipment for controlling such engine functions as fuel injection, fuel density compensation, cold start, etc. Secondarily, there are other electronic uses, such as onboard diagnostic equipment and, presently, vehicle accessory control systems for controlling actuation of vehicle mounted accessories such as lights, e.g. body lamps, headlights, taillights, etc., small motors, and switching relays.

In these vehicle electronic accessory control systems an operator command to turn on an accessory is a discrete signal provided by striking a touch plate associated with the accessory. The discrete command signal (on/off) is translated into a selected format electrical signal and transmitted by a master accessory control unit responsive to all accessory touch plate inputs, to solid state power switches connected to the related accessories. The command signals are transmitted in a time division multiplexed (TDM) signal format on a vehicle signal communications bus, such as that disclosed and claimed in a commonly owned, copending application of the same assignee entitled: Multiplex Control System Having Enhanced Integrity, U.S. Ser. No. 540,581, filed by William M. Floyd et al, on Oct. 7, 1983.

The accessory control system, vehicle communications bus, and solid state power switches provide cost savings in vehicle wiring and fuses, improve reliability, and allow for the incorporation of further control options which can improve operator performance and increase driving safety. Despite this, it is the bottom line cost which determines their use by motor vehicle manufacturers.

Of the items included in the accessory control system, the solid state power switches are the most difficult to cost justify. First, due to the fact that the prior art switches provide simple on/off switching of the accessory load; to the extent that these switches provide self healing features, i.e. automatic shutdown for shorted loads, they cost compete with the standard glass fuse. Second, the load current transients ("inrush current") require high power switches which can survive these transient high power states. These solid state switches, such as the Motorola XPC1500 "monolithic logic to power switch", use high power N channel MOS FETs to provide load switching; the high power rating being required for transient protection rather than steady state operation. Finally, notwithstanding the use of these high power solid state switches, there still exists the probability for failure since actual transients often exceed expected transient durations. This means costly repair/replacement.

DISCLOSURE OF INVENTION

The object of the present invention is to provide a solid state power switch which overcomes the deficiencies of the prior art switches for use in switching vehicle accessory loads.

According to the present invention, a solid state power switch includes a gated switch for connecting vehicle power to a switch associated load, and current sensing circuitry for comparing the magnitude of the actual load current to reference current values less than those which exceed the maximum power dissipation specified by the gated switch manufacturer, and for turning off the gated switch whenever the actual load current exceeds the reference current value. In further accord with the present invention, the sensing circuitry reference current value includes transient current values corresponding to gated switch transient response during an initial turn on period and steady state current values corresponding to switch operation in a steady state period, both provided by a time variant signal characterized by a peak reference current value occurring at the initial turn on period with successive reference current values decreasing in an essentially exponential manner to a steady state reference current value in the steady state period.

In still further accord with the present invention, the solid state power switch includes status circuitry for reporting the status of the accessory load as either normal, open circuited, or short circuited and for reporting a gated switch that is shorted. The open circuit status is reported by a discrete signal provided by open circuit detector circuitry in the presence of a zero load current magnitude and the short circuit status reported by a discrete signal provided by latching a short circuit detector on each occurrence of an actual load current magnitude greater than the associated reference current value, the absence of either discrete signal representing a normal load status. A gated switch short can be detected by the absence of an open circuit status when the switch is commanded off.

The solid state power switch of the present invention allows the use of a lower power, less expensive gated switch to connect vehicle power to accessory load by shutting off the switch in the presence of potentially fatal transients exceeding that specified by the switch manufacturer. The time variant reference current values are sized for the transient response characteristics of the accessory load to avoid unnecessary shutdown, but within the specified transient response of the gated switch. In addition, the monitoring of load current allows for the reporting of accessory status, i.e. shorted and open load conditions, immediately to the vehicle operator. This permits the opportunity for immediate corrective action. This is important both for vehicle safety as well as corrective maintenance, and provides a measurable cost benefit which when combined with the cost savings associated with the use of lower power gated switches makes the present vehicle switch more cost competitive.

These and other objects, features, and advantages of the present invention will become more apparent in light of the following detailed description of a best mode embodiment thereof, as illustrated in the accompanying Drawing.

BEST MODE FOR CARRYING OUT THE INVENTION

Figure 1:
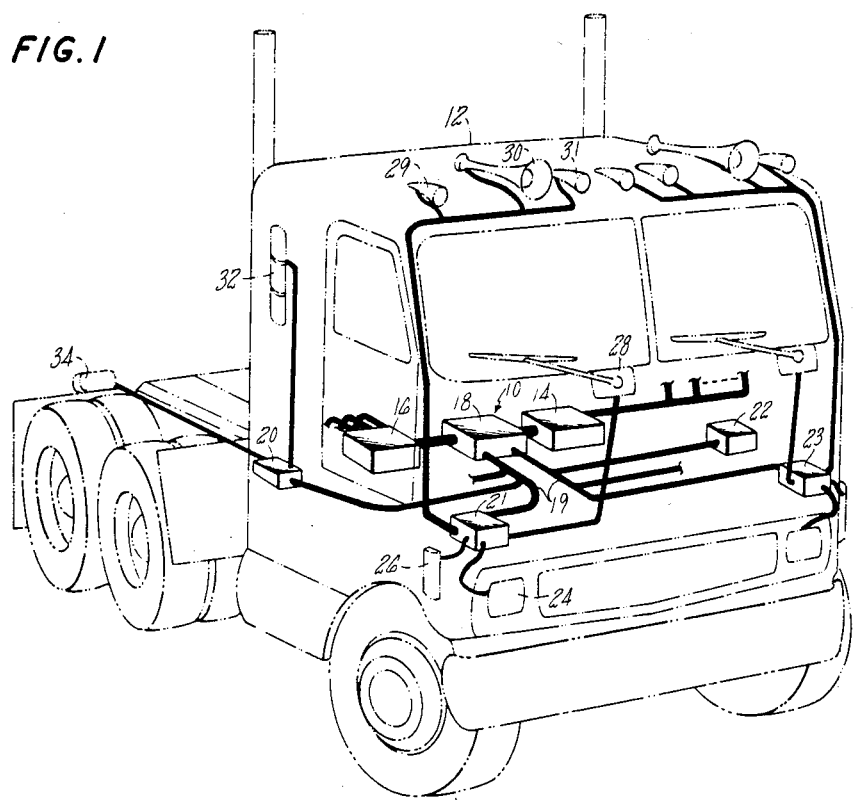
FIG. 1 is a perspective illustration of a vehicle electronic control system (VECS) in which the present invention may be used.

FIG. 1 is a perspective illustration of a vehicle electronic control system (VECS) 10 shown installed in a phantom outline of a motor vehicle 12. The VECS has various function modules. These include a dashboard control module 14 which processes all of the operator entered commands for actuation (turn on/turn off) of the motor vehicle accessories, and a control/communications module 18 which provides communications between the dashboard control module and a plurality of remotely located accessory control modules (ACM) 20–23.

The ACMs are located throughout the vehicle; adjacent the accessory group serviced by the ACM, such as the vehicle's right side headlight 24, sidelight 26, windshield wiper motor 28, and rooftop lights and horn 29–31, which are all controlled by the ACM 21. The ACM 23 services the accessories on the vehicle's left-hand side. The ACM 20 controls the cab side light group 32 and taillight 34, and so on.

In the present invention, each ACM receives control signal information for controlling the turn on/turn off of the ACM related accessory functions. The control information is received from dashboard control module 14 via the vehicle communications bus 19. The ACM activates/deactivates a particular accessory by switching/removing electrical power to and from the accessory load. In addition each ACM reports the status of each accessory as operational, open circuited, or short circuited. The status is communicated back through the system bus to the dashboard control module, which displays the information to the vehicle operator.

Figure 2:
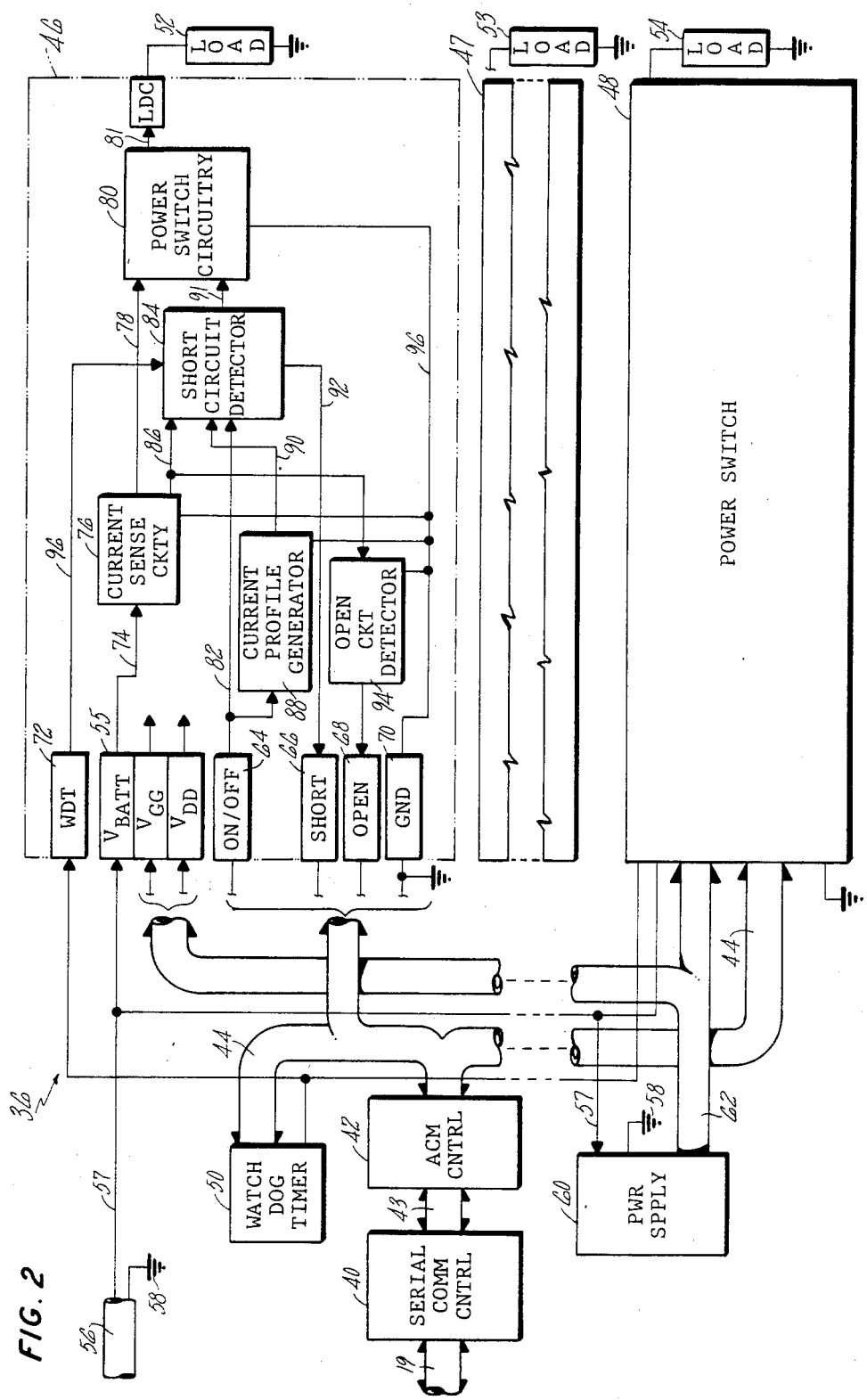
FIG. 2 is a block diagram illustrating the architecture of the present solid state power switch as installed in one element of the VECS of FIG. 1.

FIG. 2 is a block diagram of an ACM 36 according to the present invention. The ACM transmits and receives information over the VECS system serial communications bus 19 through serial communications input/output (I/O) interface 40. The communications I/O formats the information to and from the ACM 36 based on the protocol for a particular VECS system. The communications I/O provides information to and receives information from an ACM control 42 on line 43. The ACM control demultiplexes (DMUX) information received from lines 43 onto the ACM internal data bus 44 to each of a plurality of smart power switches 46–48, and to a watchdog timer 50. The ACM control multiplexes (MUXs) the status information provided on the bus 44 by the smart switches, into serial format on lines 43 for transmission through the communications control 40 to system bus 19.

Functionally the smart power switches 46–48 are single pole—normally open and connect the vehicle electrical power source, e.g. battery, to the vehicle load devices 52–54. The switches have identical architecture; illustrated by the block diagram of the switch 46. The switches receive electrical power from the battery through lines 56, including high potential line 57 and ground line 58. The nominal range in battery voltage is from nine to fifty five volts. Battery power is also provided to ACM power supply circuitry 60, which provides regulated output voltages $V_{DD}$ and $V_{GG}$ on lines 62 to the switches. Command signal information related to load device actuation, i.e. ON/OFF, is received at switch input 64, and load device status information, i.e. SHORT, OPEN, is provided from output terminals 66–68 to the ACM internal bus. A signal ground line 70 is included as part of the bus. Finally, the watchdog time (WDT) information is received at input 72.

The battery power at input 55 is connected through line 74, current sense circuitry 76, and line 78 to power switch circuitry 80. The power switch connects the power source through line 81 output terminal "LDC" to an accessory load device 52, on command. The command signals are received at input 64 and presented through line 82 to short circuit detector 84. The detector 84 also receives sensed information on the load device current signal magnitude from current sense circuitry 76 on line 86, and a time variant signal defining a reference current signal magnitude from current profile generator circuitry 88 on line 90.

Figure 3:
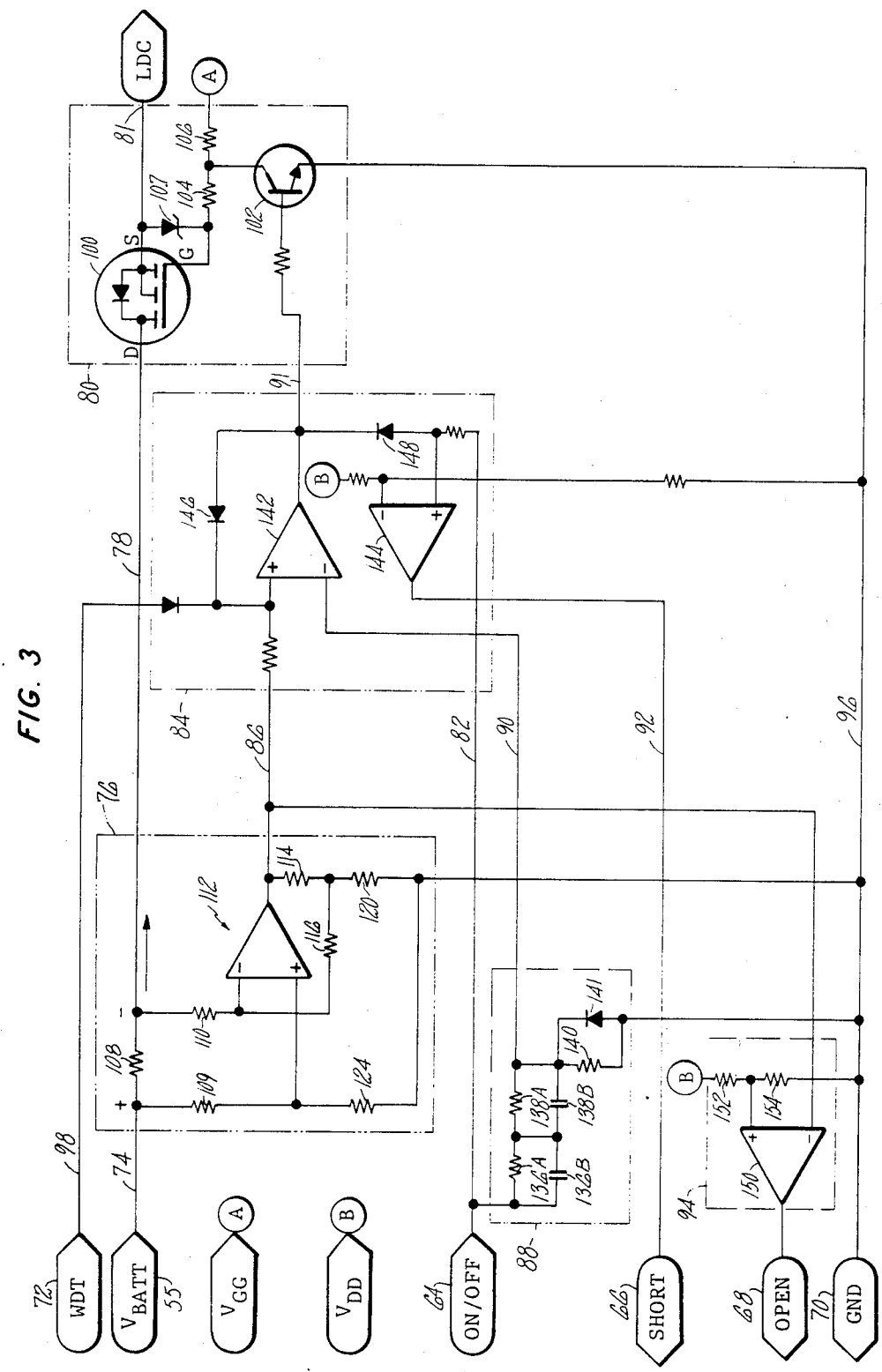
FIG. 3 is a detailed schematic of the solid state power switch shown in FIG. 2.
Figure 2:
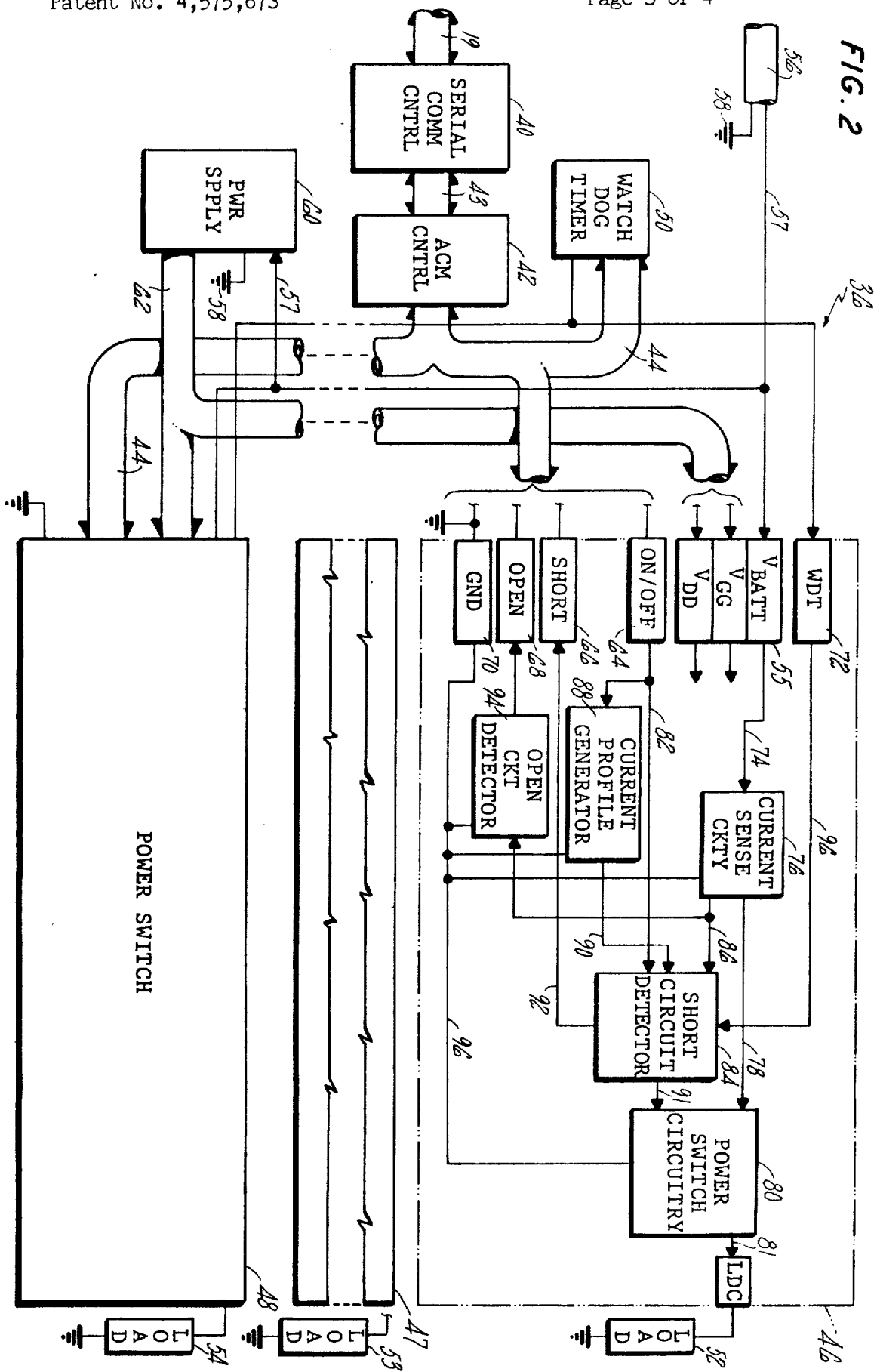
Figure 3:
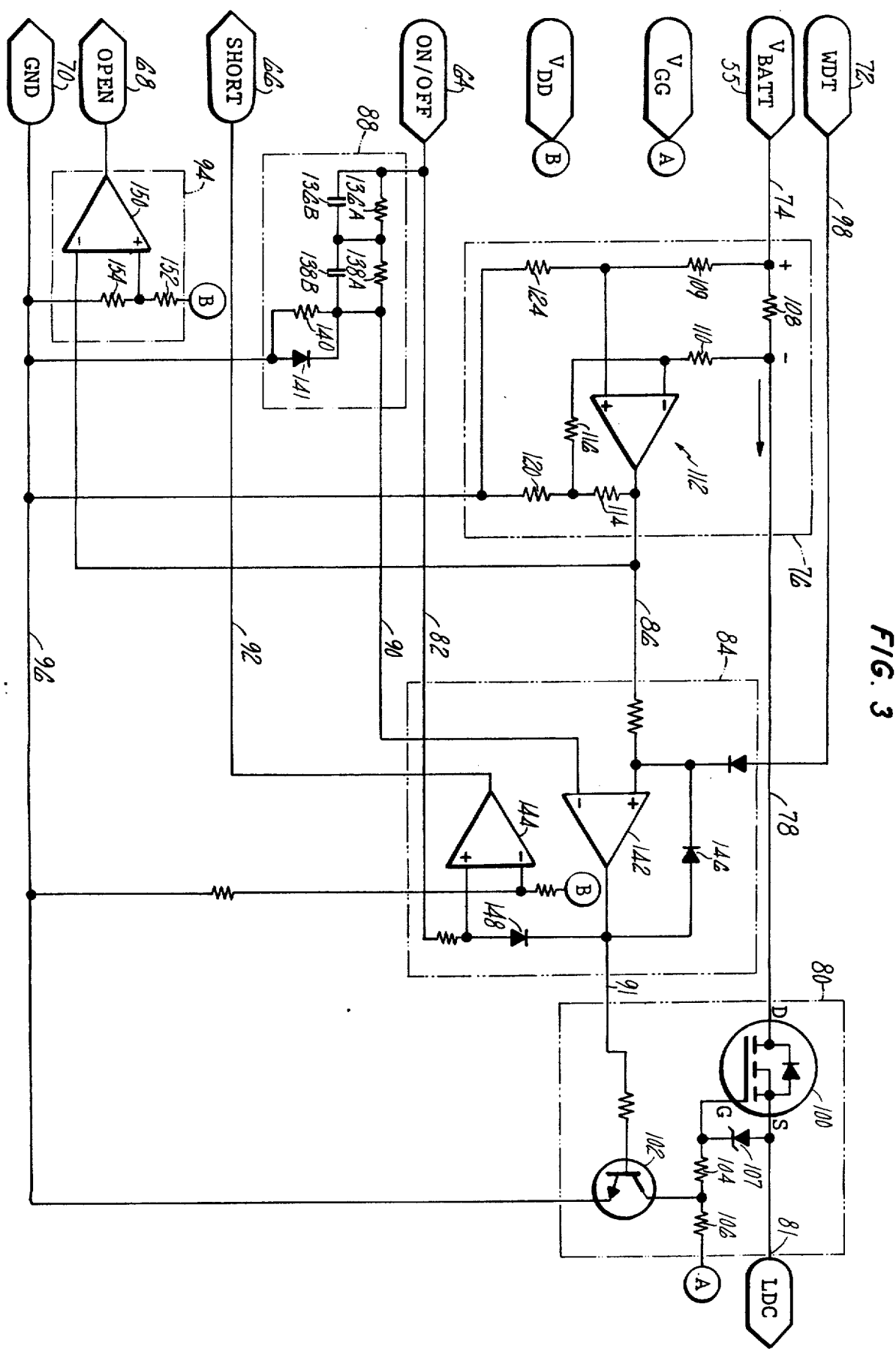

As described in detail with respect to FIG. 3, the detector compares the actual load current signal magnitude with reference current signal magnitude. As long as the actual load current is less than the reference current the detector provides a gate signal on line 91 to turn on the power switch. If actual load current is greater than the reference current the detector removes the gate signal to disable the power switch.

Each switch provides the open circuit and short circuit load status information in the form of discrete, bistable signal outputs when the switch is commanded on, as described hereinafter. If the load is operative both outputs are in a first state (e.g. 0,0). Otherwise they report a load fault as either a short circuit load (1,1) or an open circuit load (0,1). When the switch is commanded off, the normal state of the gated switch is (0,1); a status report of (0,0) at switch turn off indicates a shorted gates switch. The short circuit indication is provided on line 92 to output terminal 66. An open circuit detector 94 provides the open indication to output terminal 68. The switch also includes signal ground bus 96 connected through terminal 70 to the ACM bus 44.

Referring now to FIG. 3, in a detailed schematic illustration of a best mode embodiment of the ACM switch 46, power switch circuitry 80 includes a field effect transistor (FET) 100. For a negative battery ground system the vehicle battery power is positive and the FET is an N channel type, such as an IRF540. The FET gate (G) input is signal controlled by switching transistor 102 in combination with a gate bias network. The network series resistors 104, 106 connected in series to the regulated output $V_{GG}$ ($V_{BATT}+10VDC$) from power supply 60. The FET drain (D) terminal is connected to the line 78 input from the vehicle battery and the source (S) terminal is connected through output line 81 to the power consuming load device 52.

For the N channel FET the gate to source voltage ($V_{GS}$) must be approximately +10VDC for FET turn on, i.e. drain to source conduction. Switching transistor 102 is an NPN type, such as the 2N5550, which controls $V_{GS}$ by alternately opening and grounding the junction of the gate network resistors 104, 106. The Zener diode 107 prevents excessive voltage on the FET gate during transient or abnormal conditions. The switch 102 base drive is a gate signal from the detector 84 on line 91. With the gate signal high (i.e. "positive") the transistor is on. This grounds the gate network, drives $V_{GS}$ to zero, and shuts the FET off. For a low gate signal input (i.e. zero) the transistor 102 is off, $V_{GS}$ is equal to $V_{GG}$, and the FET 100 is turned on, conducting battery source current to the load device.

As described hereinafter, a command signal at terminal 64 causes the current profile generator 88 to produce a time variant output signal on line 90. The real time amplitude of the time variant signal defines reference current signal values over succeeding time intervals following the presentation of the command signal. The reference current signal values range in amplitude from a peak reference current amplitude occurring in a first time interval following appearance of the command signal to a steady state reference current signal value in succeeding time intervals. The relative ratio of peak reference current to steady state reference current is on the order of 10-14.

The reference signal nominally exceeds the amplitude of the sensed load current signal on line 86 so that the detector output on line 91 is zero. This causes the FET to turn on and conduct load current between the drain and source terminals. If the actual load current exceeds the time variant signal magnitude, the detector provides a positive output gate signal, turning on transistor 102 and turning off the FET 100. The initial presence of a command signal turns on the FET 100 and "but for" an actual current greater than the reference current the FET remains on. For any actual current value above the reference value the FET is turned off.

The current sense circuitry 76 includes a current sense resistor 108. The voltage drop across resistor 108 is proportional to the actual load current, and is provided differentially through resistors 109, 110 to the inverting/noninverting inputs of an operational amplifier 112. The amplifier is a known type, connected in closed loop fashion with feedback resistors 114, 116, and resistor 120 connected to signal ground 96. The amplifier remains linear in transient operation, i.e. during startup when the inrush current across resistor 108 creates a spike voltage input to the amplifier. Resistors 109, 124 provide a reference network for the amplifier noninverting input.

Figure 4:
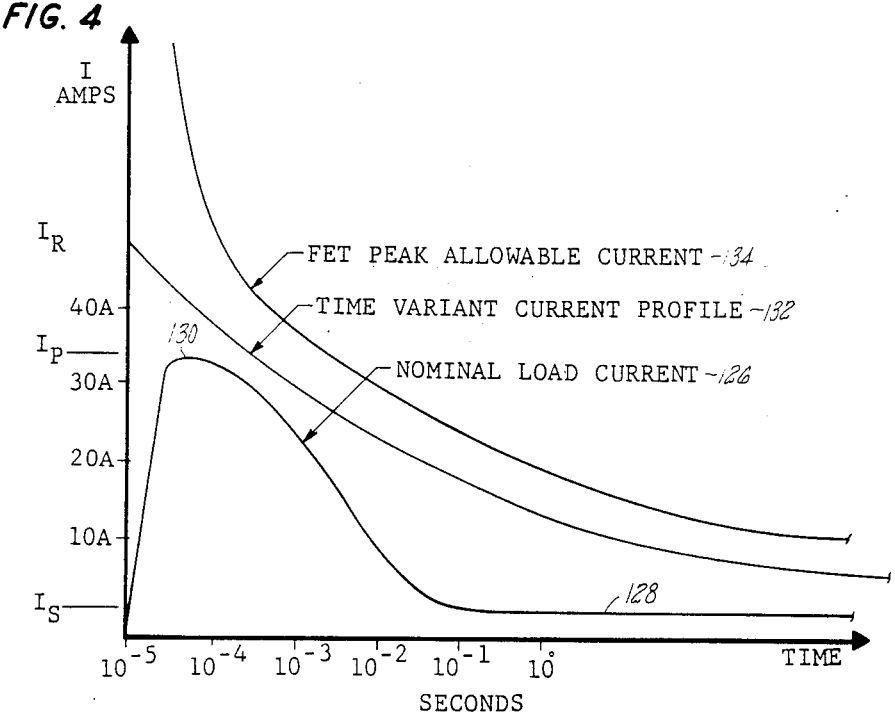
FIG. 4 is a waveform illustration used in the description of operation of the switch of FIG. 3.

The current sense output signal amplitude on line 86 represents the actual load current magnitude. In FIG. 4, waveform 126 illustrates a typical turn-on transient current response for a typical accessory load, e.g. a lamp, relay, heater element, or motor. For example, for twenty-four volt battery power and a steady state load impedance of 6.8 ohms, the steady state load current value (128) is 3.5 amperes. The steady state is defined as the time intervals succeeding the first time interval; occurring 100 milliseconds or more after command signal turn on. The steady state current value is labeled $I_S$ in FIG. 4. The peak load current occurs within the first time interval after command signal appearance, i.e. 100 microseconds of command signal turn on, with values 10-12 times higher than the steady state, i.e. 35-42 amperes for the 3.5 amperes value of $I_S$. The peak current value is labeled $I_P$ in FIG. 4.

The time variant signal on line 90 from the current profile generator 88 is shown in FIG. 4, as a current profile waveform 132. It defines the reference current vs. time relationship beginning with command turn on of the FET (100, FIG. 3) through to the FET steady state operation. The current profile's successively lower current values define an energy consumption profile above which the FET has a high probability of failure. The time variant reference current values are within the FET manufacturer's allowable peak current profile shown by waveform 134. This allowable profile is the limit of guaranteed FET performance. The reference current signal values 132 are spaced at a selected differential value below the corresponding allowable current values to ensure a reasonable tolerance rating, but above the nominal load current profile 126 to minimize false shutdowns.

The time variant signal is generated by the current profile generator 88. In the best mode embodiment of a discrete component arrangement, the profile generator comprises a two-stage cascaded RC filter; resistor capacitor combinations 136A, 136B, 138A, 138B. Resistor 140 provides impedance balancing betweem the profile generator output and the amplifier input. Diode 141 provides a discharge current path for capacitors 136B, 138B during command signal turn off. For a command signal step input on line 82 the duel RC filters provide a dual slope exponential voltage signal on line 90. This dual slope exponential approximates the time variant signal waveform 132 of FIG. 4. It should be understood, however, the various other known arrangements may be used to provide the time varient signal.

The short circuit detector 84 includes dual amplifiers 142, 144 for detecting load short circuit and for reporting shorted status. Both amplifiers are known type, high speed comparators such as the LM193. Amplifier 142 receives the sensed load current signal on line 86 and the time variant reference current signal on line 90 at the non-inverting and inverting inputs respectively. Both input signals are positive. When the actual load current is less than the reference current the differential input voltage (non-inverting to inverting inputs of the comparator) is negative, and the signal output on line 91 is zero. This turns off transistor 102 which turns on FET 100. Whenever the actual current is greater than the reference current the differential input is positive and the comparator output becomes positive. The positive output turns on transistor 102, turning off the FET. Diode 146 provides a feedback path from line 91 to the non-inverting input for comparator positive output signals. Once the amplifier output on line 91 exceeds the profile voltage on line 90 the comparator "latches" into a positive feedback state; the output is latched positive to keep the FET off. The output is reset by a new command signal to turn-on, via the dual stage current profile.

The amplifier 142 serves a dual purpose. During overlaod the FET is turned off and a current sense output will return to its reference. At that time the FET would turn back on reconnecting the overload producing oscillations until the overload or command signal is removed. Diode 146 prevents this by causing amplifier to latch high when the FET is turned off for any reason. The amplifier 142 therefore serves both as a detector and a latch.

The latched current detector therefore requires a positive spike higher than the latching voltage at the non-inverting input of the amplifier at turn-on. This is provided by the first state (136A, 136B) on the dual slope current profile generator. The second stage (138A, 138B) actually provides the profile (132 FIG. 4).

With the presence of a turn on command signal, an actual load current greater than the reference current value is assumed to be a short circuit, which is reported by amplifier 144 as a discrete signal on line 92 to output terminal 66. With comparator 142 zero (normal operation) the output of amplifier 144 is negative due to diode 148 which pulls down the comparator negative voltage to the noninverting input of amplifier 144. In a short circuit condition amplifier 142 is positive, diode 148 is back biased, the amplifier 144 inverting input becomes positive with respect to the non-inverting input, providing line 64 is high. The amplifier output on line 92 becomes positive. The positive signal state is reported back through the dashboard module 14 (FIG. 1) to the operator as a short circuit.

Open circuit detector 94 includes comparator 150, connected at its inverting (−) input to the sensed load current signal on line 86 from current sense circuitry 76. The noninverting (+) input receives a minimum load current signal from the divider network of resistors 152, 154 connected in series between $V_{DD}$ and signal ground 96. The minimum reference current value is selectable, based on application. It represents a load current value below which it is assumed that the load device is not drawing current, i.e. open circuit.

With actual load current greater than the minimum reference current value the inverting (−) input is more positive than the noninverting (+) input, and the comparator output at terminal 68 is negative. This is an indication of normal operation. If the actual current value falls below the minimum reference the comparator output at terminal 68 becomes positive, indicative of an open circuit load condition.

Of course the open circuit detector and short circuit detector signal output polarities may be changed as desired. The bistable states indicative of normal, shorted, or open circuit status is a matter of choice.

Similarly, although the invention has been shown and described with respect to a best mode embodiment thereof, it should be understood by those skilled in the art that various other changes, omissions and additions may be made therein without departing from the spirit and scope of the invention.

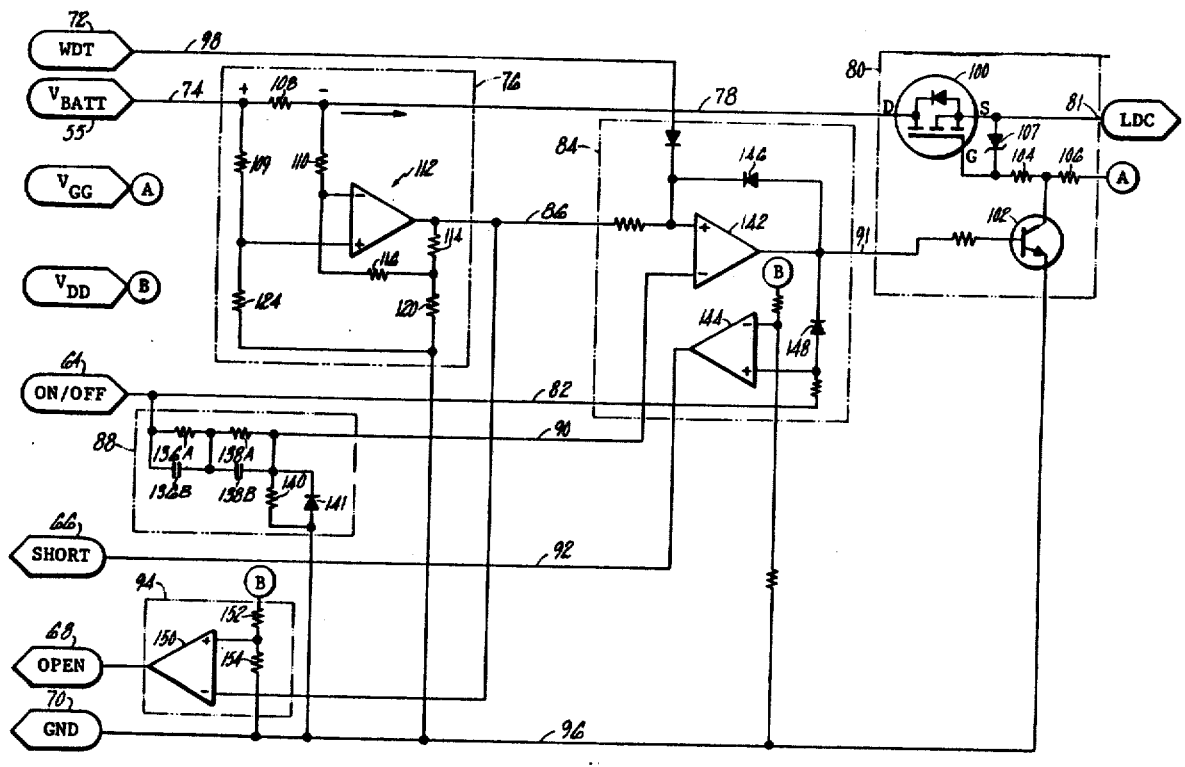

We claim:

1. Apparatus for selectably energizing a power consuming device with an electrical current signal from an electrical power source in response to a command signal presented thereto, comprising:
   gated switch means, having a first terminal connected to the power source and a second terminal connected to the power consuming device, for conducting the electrical current signal therebetween in the presence of a gate signal presented to a gate input thereof, and for not conducting the current signal therebetween in the absence of said gate signal;
   reference signal source means for providing, in the presence of the command signal, a time variant signal representative of reference current signal magnitudes for each of a plurality of succeeding time intervals occurring in the presence of the command signal; and
   detection means, responsive to said time variant signal and including sensor means for providing sensed signals indicative of the actual magnitude of the electrical current signal, for providing said gate signal to said gate input in each of said time intervals in which said sensed actual current signal magnitude is less than said reference current signal magnitude.

2. The apparatus of claim 1, wherein said gated switch means further includes a maximum power dissipation specified for an electrical current signal conducted between said first and second terminals, and wherein said reference current signal magnitude in each of said time intervals is less than an electrical current signal magnitude corresponding to said specified maximum power dissipation.

3. The apparatus of claim 1, wherein said detection means provides said gate signal only in said time intervals occuring prior to a time interval in which said sensed actual current signal magnitude is not less than said reference current signal magnitude.

4. The apparatus of claim 1, further comprising:
   means, responsive to the presence of the command signal and to the presence of said gate signal, for providing a short circuit signal indication in the absence of said gate signal in the presence of the command signal.

5. The apparatus of claim 1, further comprising:
   means, responsive to the presence of the command signal and to the presence of said sensed signals indicative of the actual magnitude of the electrical current signal, and including a reference signal source for providing a minimum reference current signal magnitude indicative of a selected minimum electrical current signal value, for providing an open circuit signal indication in response to an actual electrical current signal magnitude less than said minimum reference current signal magnitude in the presence of the command signal.

6. The apparatus of claim 1, wherein said reference signal source means provides said time varient signal having a peak reference current signal value in a first of said time intervals following the presence of the command signal and having a steady state reference current signal value in said time intervals following said first time interval, said time varient signal magnitude decreasing from said peak reference current signal value to said steady state reference current signal value in a substantially exponential manner.

7. The apparatus of claim 6, wherein said reference signal source comprises a plurality of cascaded signal networks, a first network providing a first exponential signal in response to the presence of the command signal and each succeeding network providing an exponential signal in response to said exponential signal from a preceeding network; said cascaded networks providing said time variant signal as a combination of said exponential signals.

8. The apparatus of claim 6, wherein
   the electrical current signal has a maximum value less than said peak reference current signal value in said first of said time intervals and a minimum value less than said steady state reference current signal value in said time intervals following said first time intervals, and wherein
   a ratio of said maximum value to said minimum value is less than twelve to one.

9. The apparatus of claim 7, wherein said gated switch means comprises a field effect transistor (FET).

10. The apparatus of claim 9, wherein
    said field effect transistor includes a specified FET peak current signal value greater than said peak reference current signal value in said first of said time intervals and a specified FET steady state current signal value greater than said steady state reference current signal value in said time intervals following said first time interval, and wherein
    a ratio of said specified FET peak current signal value to said specified FET steady state signal value is greater than twelve.

* * * * *

UNITED STATES PATENT AND TRADEMARK OFFICE
CERTIFICATE OF CORRECTION

PATENT NO. : 4,575,673               Page 1 of 4

DATED : March 11, 1986

INVENTOR(S) : Rinaldo R. Tedeschi et al.

It is certified that error appears in the above-identified patent and that said Letters Patent is hereby corrected as shown below:

The title page should be deleted to appear as per attached title page.

Figures 2 and 3 of the drawings should be deleted to be replaced with Figures 2 and 3 as shown on the attached sheets.

Signed and Sealed this

Twenty-first Day of October, 1986

[SEAL]

*Attest:*

DONALD J. QUIGG

*Attesting Officer*         *Commissioner of Patents and Trademarks*

United States Patent [19]

Tedeschi et al.

[11] Patent Number: 4,575,673

[45] Date of Patent: Mar. 11, 1986

[54] SOLID STATE ELECTRONIC SWITCH FOR MOTOR VEHICLES

[75] Inventors: Rinaldo R. Tedeschi, Newington; Arthur R. Emery, Windsor Locks, both of Conn.; Robert A. Edwards, Woodstock, England

[73] Assignee: United Technologies Corporation, Hartford, Conn.

[21] Appl. No.: 667,050

[22] Filed: Nov. 1, 1984

[51] Int. Cl.⁴ .............................................. H02J 1/00
[52] U.S. Cl. .................................. 323/351; 323/284; 323/285; 361/18; 361/88; 307/10 R

[58] Field of Search ....................... 323/284, 285, 351; 361/18, 21, 88, 92; 307/9, 10 R

[56] References Cited

U.S. PATENT DOCUMENTS 4,428,015  1/1984  Nesler .................................. 323/284

Primary Examiner—William H. Beha, Jr.
Assistant Examiner—Anita M. Ault
Attorney, Agent, or Firm—Dominic J. Chiantera

[57] ABSTRACT

A solid state power switch includes a gated switch for connecting electrical power to a load whenever the actual load current is less than selected current reference values.

10 Claims, 4 Drawing Figures